US012595815B2

(12) United States Patent
Schwartz

(10) Patent No.: US 12,595,815 B2
(45) Date of Patent: Apr. 7, 2026

(54) COUPLING ELEMENT

(71) Applicant: Hans Schwartz, Warthausen (DE)

(72) Inventor: Hans Schwartz, Warthausen (DE)

( * ) Notice: Subject to any disclaimer, the term of this patent is extended or adjusted under 35 U.S.C. 154(b) by 254 days.

(21) Appl. No.: 18/567,843

(22) PCT Filed: Jun. 9, 2022

(86) PCT No.: PCT/EP2022/065694
§ 371 (c)(1),
(2) Date: Dec. 7, 2023

(87) PCT Pub. No.: WO2023/274679
PCT Pub. Date: Jan. 5, 2023

(65) Prior Publication Data
US 2024/0271647 A1 Aug. 15, 2024

(30) Foreign Application Priority Data

Jun. 28, 2021 (DE) .................... 10 2021 116 597.0

(51) Int. Cl.
*F16B 9/02* (2006.01)
(52) U.S. Cl.
CPC .................................... *F16B 9/02* (2013.01)
(58) Field of Classification Search
CPC . F16B 9/02; F16B 5/0685; F16B 2/22; F16M
11/041; F16M 11/22; F16M 13/022;
A47K 3/281
See application file for complete search history.

(56) References Cited

U.S. PATENT DOCUMENTS

| | | | | | |
|---|---|---|---|---|---|
| 1,058,926 | A | * | 4/1913 | Toole ...................... | B65G 7/12 |
| | | | | | 294/16 |
| 2,295,972 | A | | 9/1942 | Simmonds | |
| 3,747,166 | A | | 7/1973 | Eross | |
| 3,802,652 | A | * | 4/1974 | Holton, Jr. ............. | A01K 97/10 |
| | | | | | 248/315 |
| 4,546,566 | A | * | 10/1985 | Corrente ................ | A01K 97/10 |
| | | | | | 43/21.2 |
| 5,076,526 | A | * | 12/1991 | Zane ....................... | B62J 11/04 |
| | | | | | 24/339 |
| 5,358,205 | A | | 10/1994 | Starkey et al. | |
| 6,409,131 | B1 | | 6/2002 | Bentley et al. | |

(Continued)

FOREIGN PATENT DOCUMENTS

| | | |
|---|---|---|
| DE | 1 972 737 U | 11/1967 |
| DE | 201 16 263 U1 | 1/2002 |

(Continued)

OTHER PUBLICATIONS

International Search Report in PCT/EP2022/065694, mailed Oct. 6, 2022.

(Continued)

*Primary Examiner* — David M Upchurch
(74) *Attorney, Agent, or Firm* — Collard & Roe, P.C.

(57) ABSTRACT

A coupling element includes two claws which are arranged on a coupling member, are spaced apart from one another in an axial direction, and each have two gripping fingers forming a claw mouth; the free ends of the gripping fingers that delimit the claw mouth point in opposite directions and end on opposite sides in relation to the axial direction.

12 Claims, 8 Drawing Sheets

(56)          References Cited

U.S. PATENT DOCUMENTS

Figure 1:
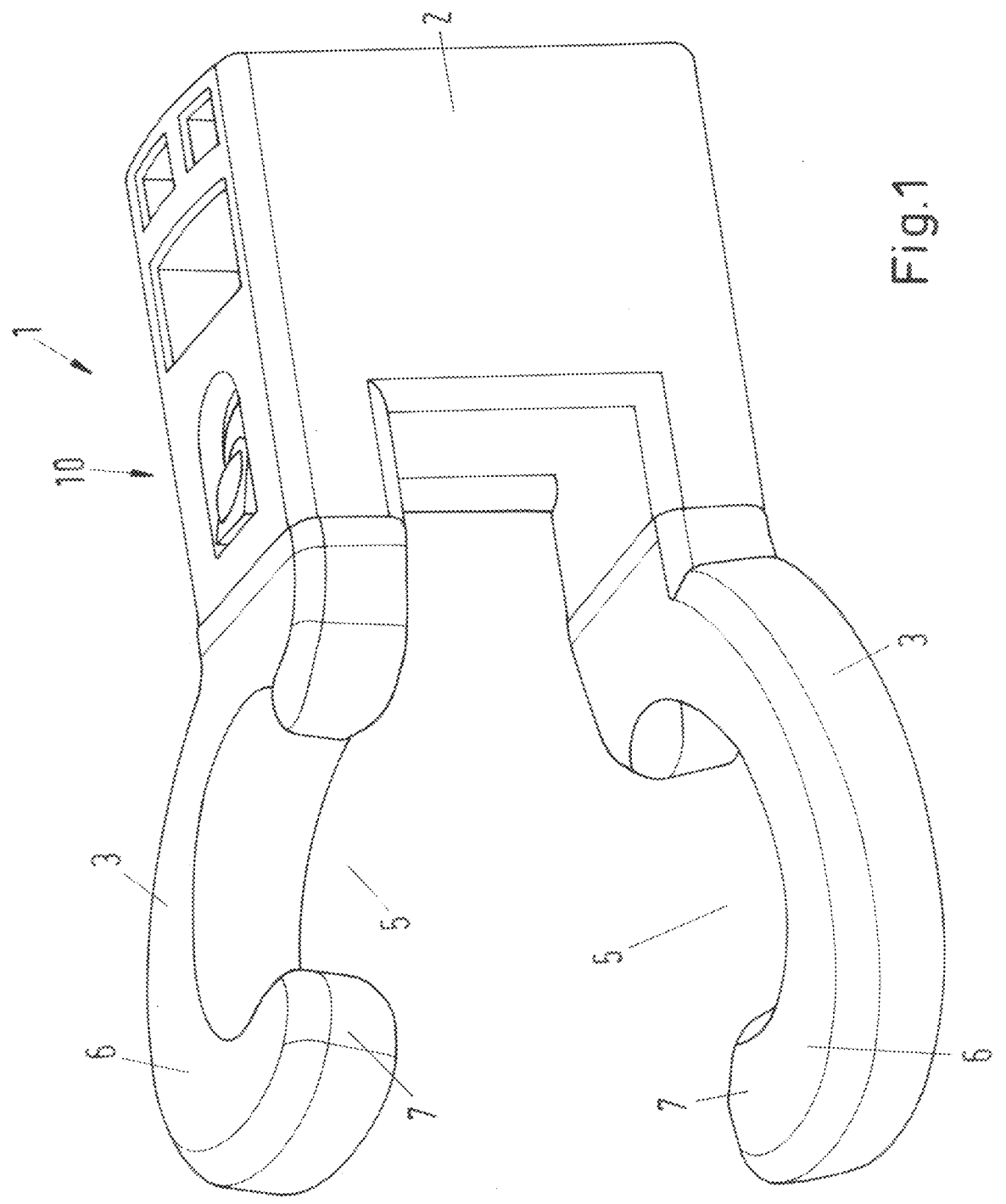

| | | | |
|---|---|---|---|
| 8,348,317 B1 * | 1/2013 | Bird | ......................... B65G 7/12 |
| | | | 294/902 |
| 8,448,270 B2 | 5/2013 | Yang | |
| 8,505,170 B1 * | 8/2013 | Gray | ...................... A45F 5/022 |
| | | | 24/3.12 |
| 10,648,494 B1 | 5/2020 | Muhammad | |
| 2001/0008246 A1 * | 7/2001 | Grover | ................. F16M 11/041 |
| | | | 224/904 |
| 2003/0015560 A1 * | 1/2003 | Grover | ................. F16M 11/041 |
| | | | 224/904 |
| 2018/0094659 A1 * | 4/2018 | McHenry, Jr. | ............ F16B 2/22 |
| 2020/0029516 A1 | 1/2020 | Drechsel | |

FOREIGN PATENT DOCUMENTS

| | | | |
|---|---|---|---|
| DE | 20 2015 003 989 U1 | 9/2015 | |
| FR | 2 616 204 A1 | 12/1988 | |
| WO | 2021/171279 A1 | 9/2021 | |

OTHER PUBLICATIONS

German Search Report dated Mar. 28, 2022 in German Application No. 10 2021 116 597.0, with English translation of the relevant parts.
European Office Action dated Jan. 22, 2026 in European Application No. 22 732 219.5, wth English translation of the relevant parts.
Canadian Office Action dated Jan. 27, 2026 in Canadian Application No. 3,222,042.

* cited by examiner

COUPLING ELEMENT

CROSS REFERENCE TO RELATED APPLICATIONS

This application is the National Stage of PCT/EP2022/065694 filed on Jun. 9, 2022, which claims priority under 35 U.S.C. § 119 of German Application No. 10 2021 116 597.0 filed on Jun. 28, 2021, the disclosure of which is incorporated by reference. The international application under PCT article 21 (2) was not published in English.

The invention relates to a coupling element having two claws arranged on a coupling body, which claws are spaced apart from one another in an axial direction and each have two gripping fingers forming a claw opening, wherein the free ends of the gripping fingers, which delimit the claw opening, point in opposite directions and end on opposite sides, with reference to the axial direction.

In sanitary facilities, there is often a need for creating additional shelf/storage possibilities within reach of the user without, in order to do so, damaging the backsplash that frequently exists or having to drill holes in walls in which lines for water and/or power supply or for a wall heating system run. There is therefore a need for making use of existing infrastructure parts or being able to use them for this purpose.

The invention is based on the task of creating a coupling element that can be coupled, in a simple manner, with existing structures.

This task is accomplished by means of a coupling element having the characteristics of claim 1. Advantageous embodiments with practical further developments of the invention are indicated in the dependent claims.

The coupling element mentioned initially is characterized in that in the case of an existing structure that has an expanse in the axial direction, such as a shower rod, the claws can be moved past the structure on the right and on the left, in a simple manner, in other words the structure is held between the claws, wherein by means of a rotation the fingers, with their claw openings, can be pressed onto the structure and secured there. In this way, existing structures can be easily used for additional holding and mounting of further accessory parts, without having to intervene in the existing infrastructure in a destructive manner for this purpose. Also, placement of the coupling element is reversible, so that it can be removed again in a simple manner.

It is furthermore provided that a bearing part is assigned to the coupling body or can be connected with it. The coupling body can therefore be supplemented in many ways, wherein different bearing parts can be used; in particular, the bearing part can be formed by a tray or a plate or a pin or a hook.

It is preferred if the claws are arranged on the coupling body at an incline relative to the axial direction and enclose an angle with one another, which has a value, in particular, between 2° and 45°. This improves the hold of the coupling element on the structure that extends in the longitudinal direction, and thereby prevents displacement of the coupling element along the rod.

It is also advantageous if the projection of the surfaces of the two claws enclosed by the gripping fingers onto the center plane between the two claws corresponds to an ellipse in their basic position. If the user now exerts a force on the two claws, so that the two claws are brought close to one another, the projection and the eccentricity of the ellipse change, so that displacement of the coupling element in the axial direction is simplified, in other words the coupling element does not have to be removed completely if a different height position with reference to the axial direction is desired.

For versatile use, it is advantageous if the claws are releasably connected to the coupling body, because in this way, coupling bodies having different designs can be used for different uses.

In the case of use of the bearing part as a shelf, it is advantageous if the base surface of the tray or plate is oriented perpendicular to the axial direction.

The structure that extends in the axial direction can have fundamentally any desired shape, wherein a cylindrical shaping as a rod presents itself. This must merely adhere to the general conditions that its cross-section is smaller than the distance between the claws in the axial direction, so as to ensure that the rod can be introduced between the claws. If, in this regard, the cross-section of the rod is greater than at least one of the claw openings, the clamping effect is improved, since the claw opening must be widened after introduction of the rod between the claws, during the rotation of the coupling element, and this corresponds to loading of a spring. This, too, increases the clamping effect.

In addition, the possibility exists that at least one of the gripping fingers of the claw, the claw opening of which is less than the cross-section of the rod, has a clamping spring assigned to it and/or that at least one of the gripping fingers of one of the claws has a material having an increased friction coefficient, in particular as compared to the side that lies on the outside, assigned to it on the side that lies on the inside. By means of the clamping spring and/or by means of the material having an increased friction coefficient, axial slipping of the coupling element, in particular along the rod, is prevented or at least reduced. In particular, it is also possible that one of the gripping fingers of one of the claws has a material having a first friction coefficient assigned to it on an inner side, and that the other one of the gripping fingers of one of the claws has a material assigned to it that has an increased friction coefficient as compared with the first friction coefficient, on an inner side.

As an example, it is pointed out that the rod can be formed by a shower rod, by a water fitting, by a handrail or by an infusion stand, all of which are characterized by a cylindrical basic shape, wherein the orientation of the rod determines how the bearing part is to be placed. In this regard, the rod can have a round or a polygonal cross-section. Use is therefore not restricted to cylindrical basic shapes having a circular cross-section.

The characteristics and combinations of characteristics mentioned above in the description and also mentioned in the following, in the figure description, and/or characteristics and combinations of characteristics shown solely in the figures can be used also in other combinations or by themselves, without departing from the scope of the invention. Therefore, embodiments that are not explicitly shown in the figures or explained, but proceed from embodiments that are explained or can be produced from them, by means of separated combinations of characteristics, should be viewed as being covered and disclosed by the invention.

Figure 2:
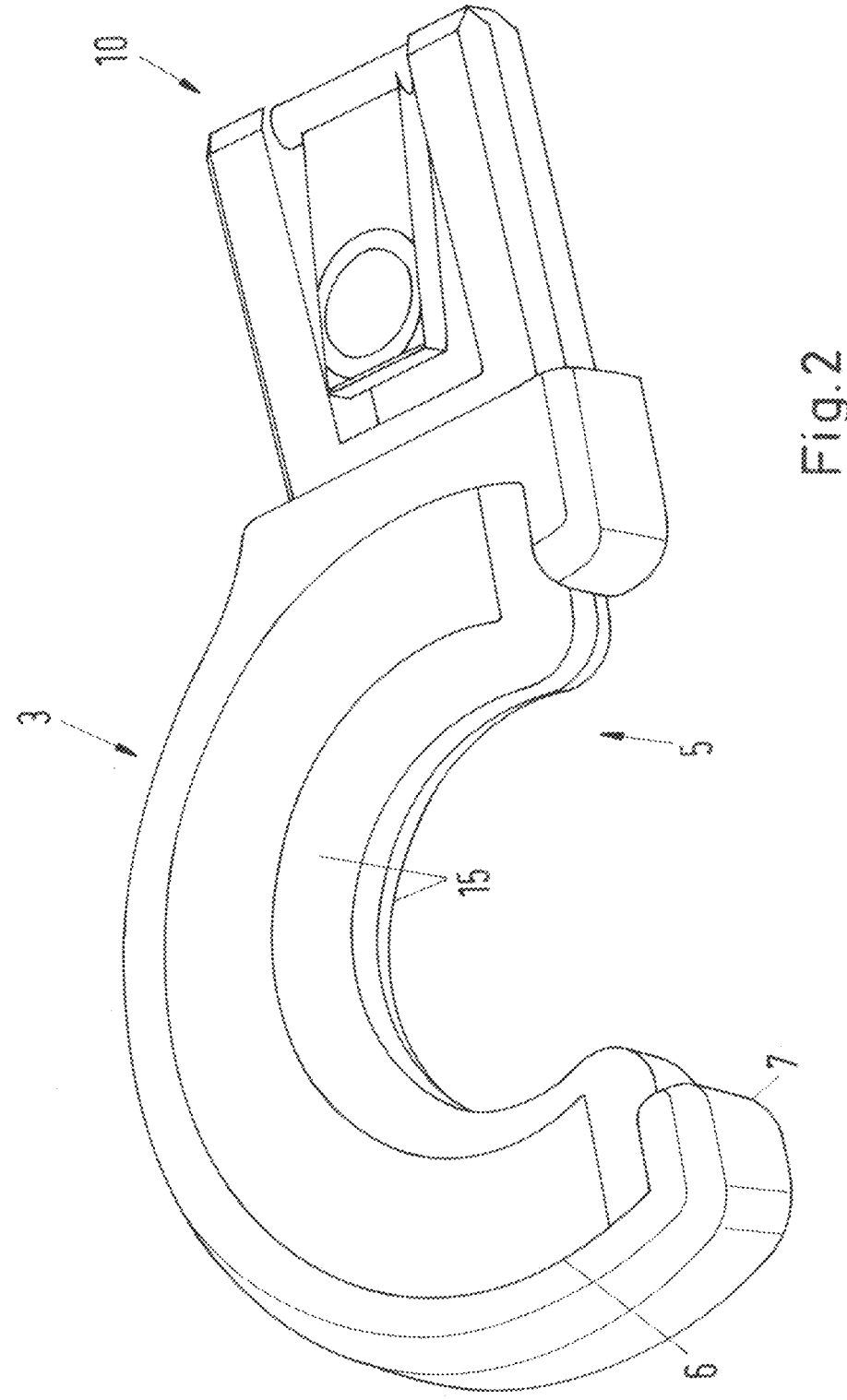
Figure 3:
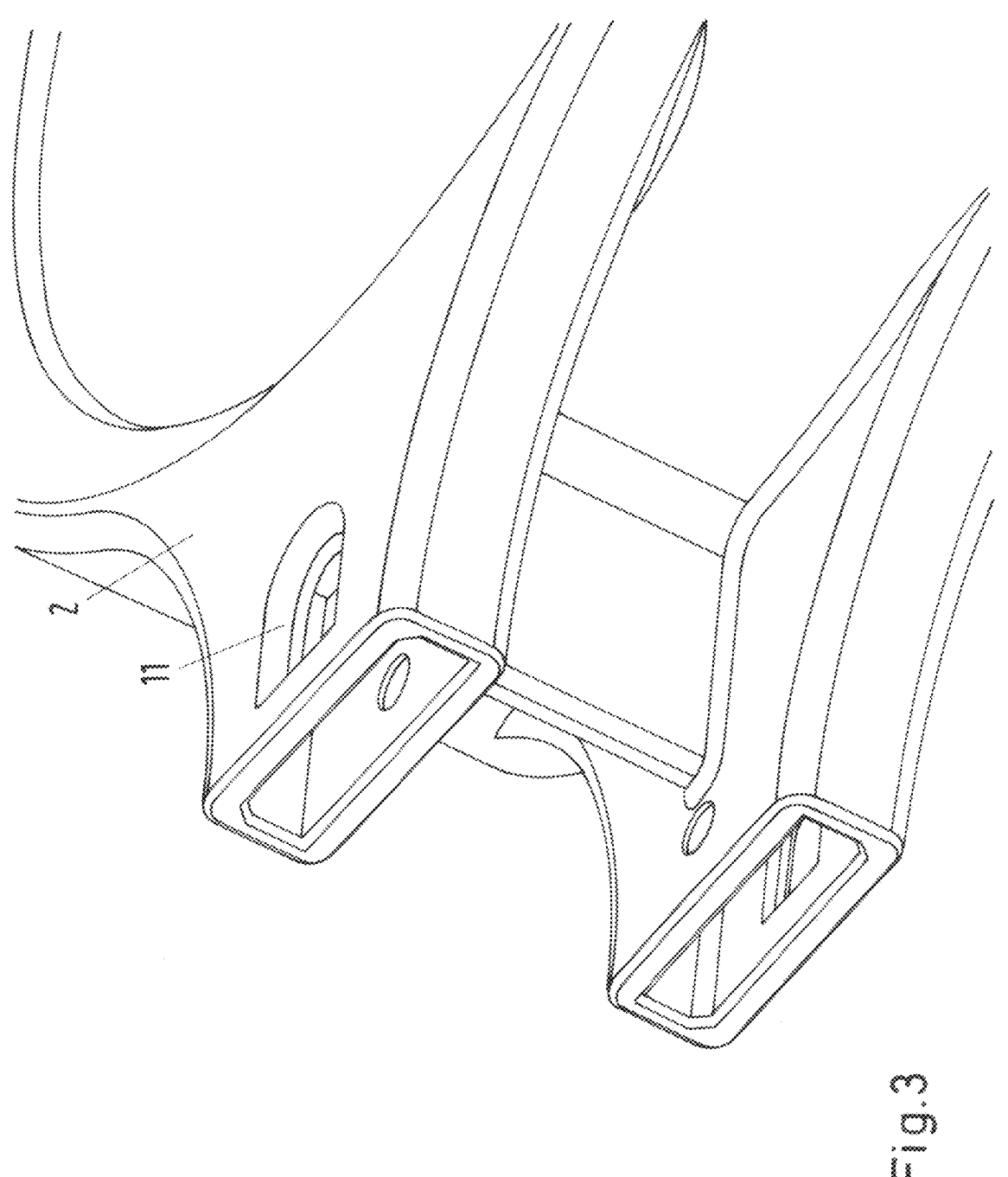
Figure 4:
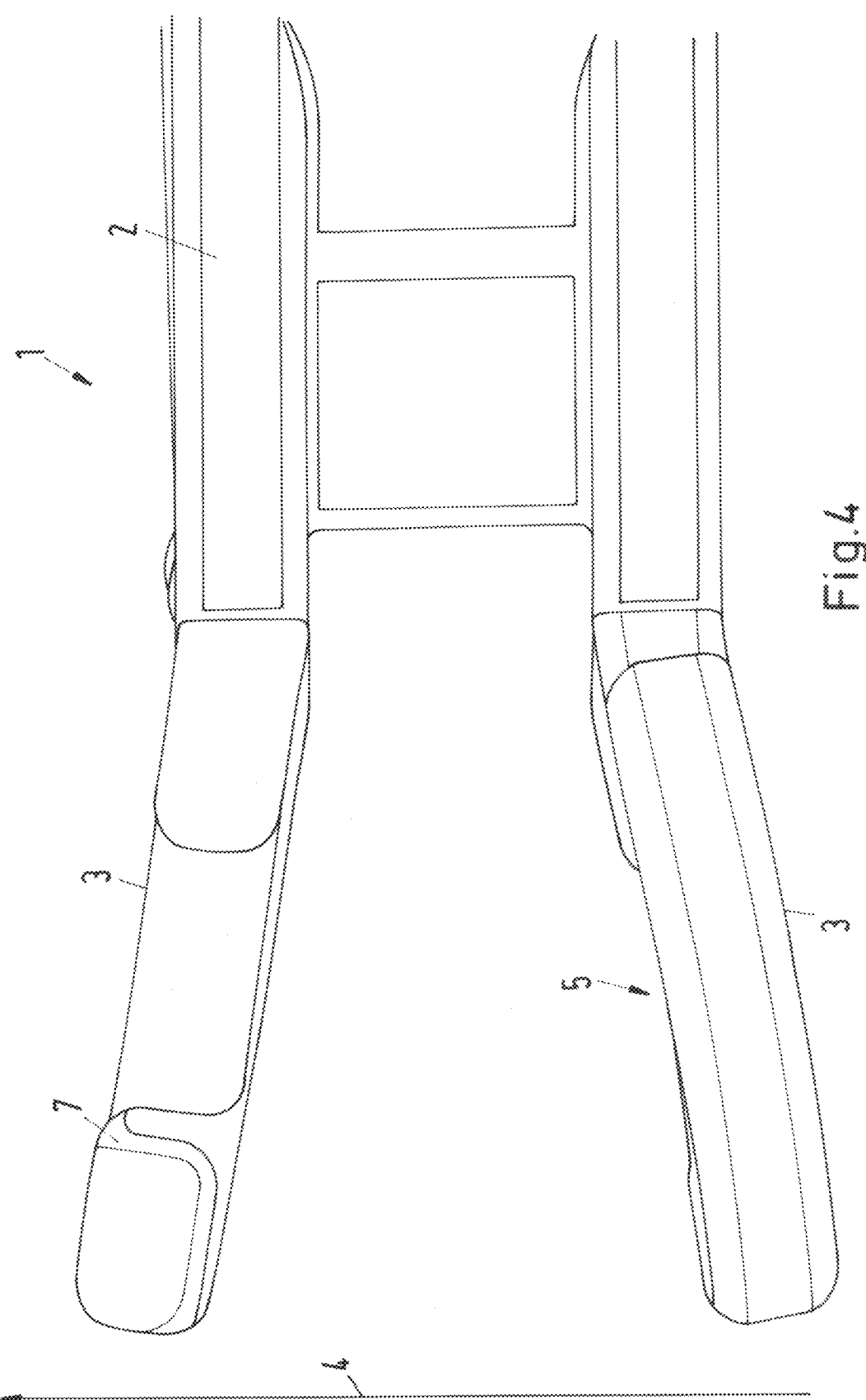
Figure 5:
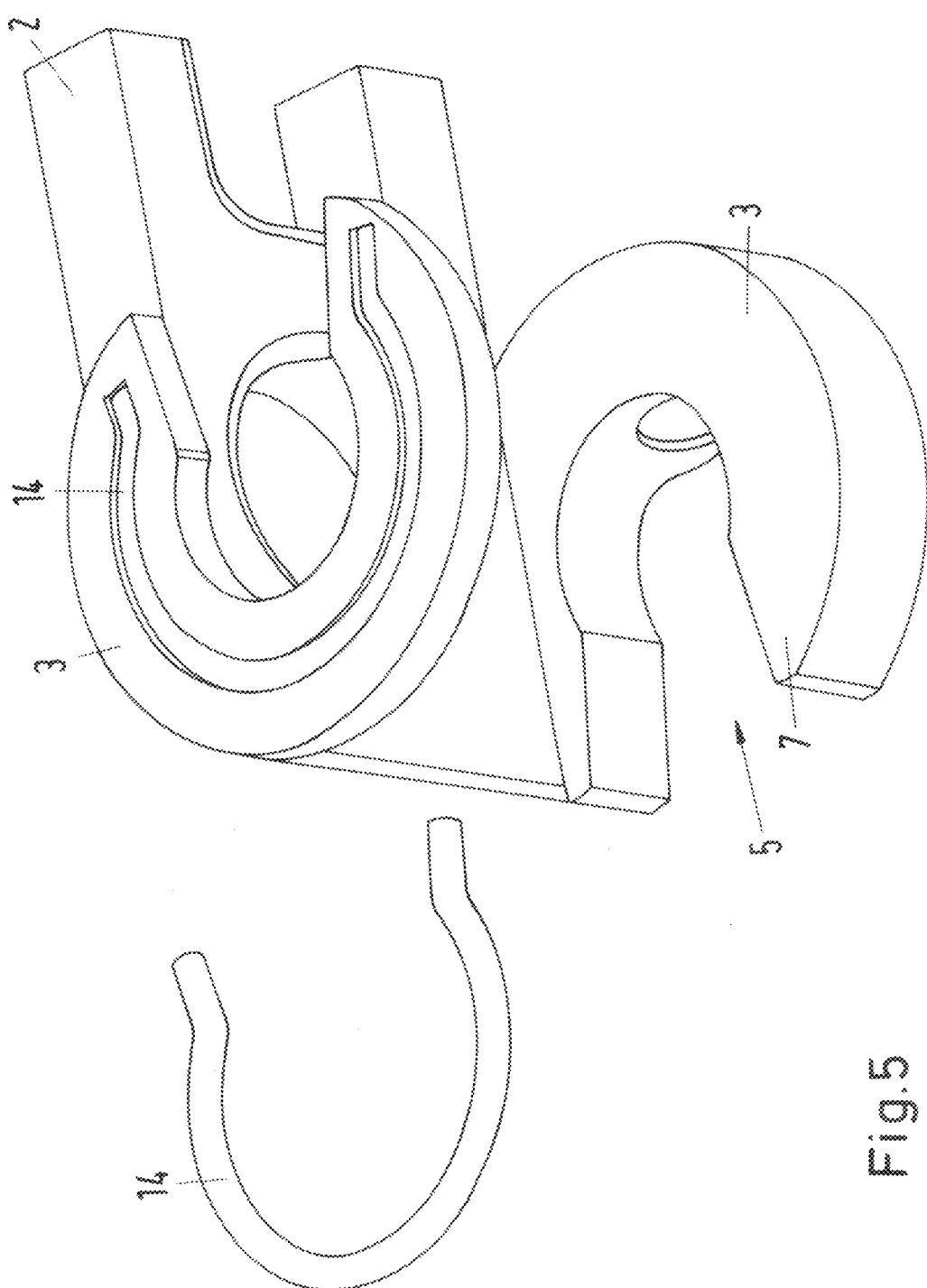
Figure 6:
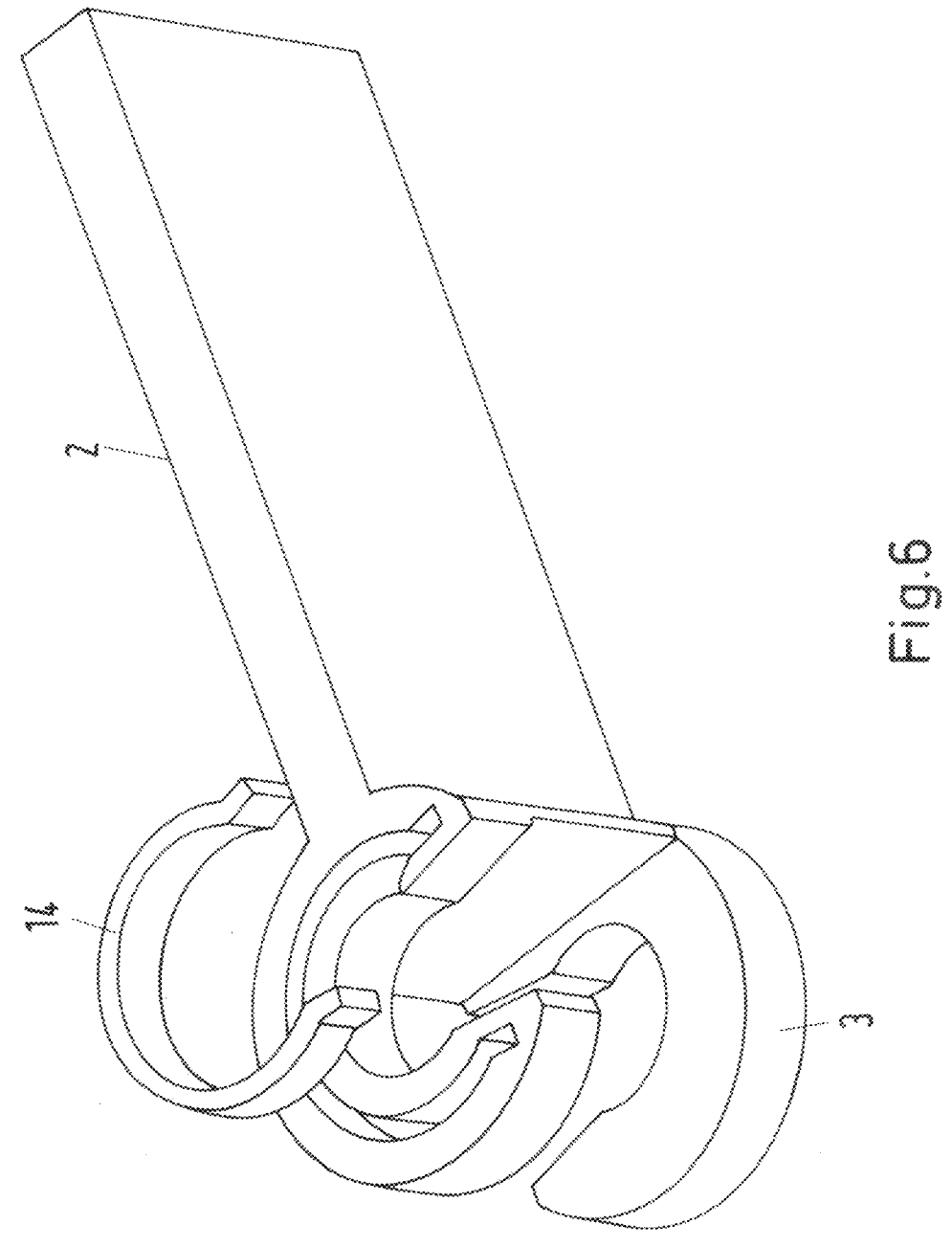
Figure 7:
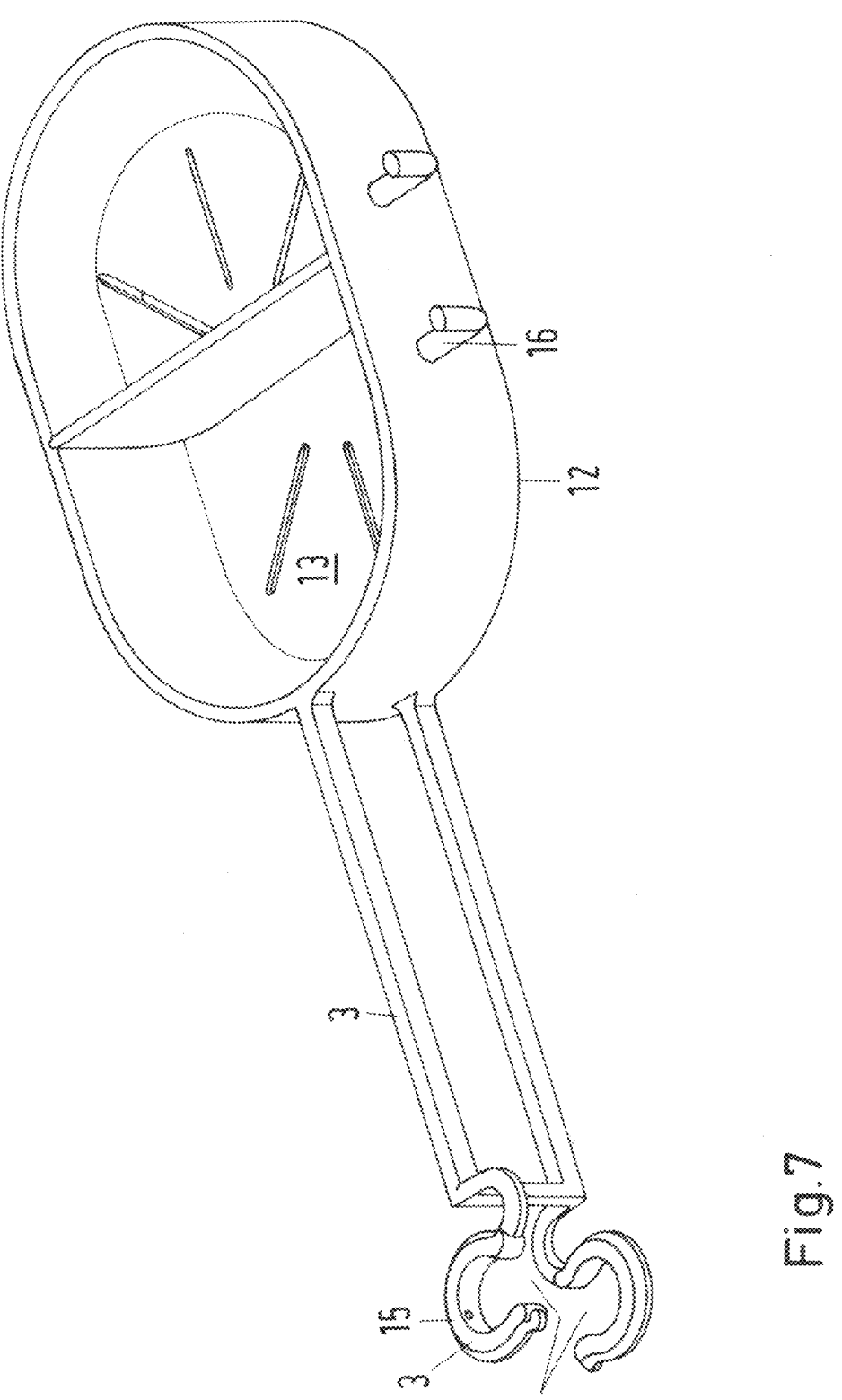
Figure 8:
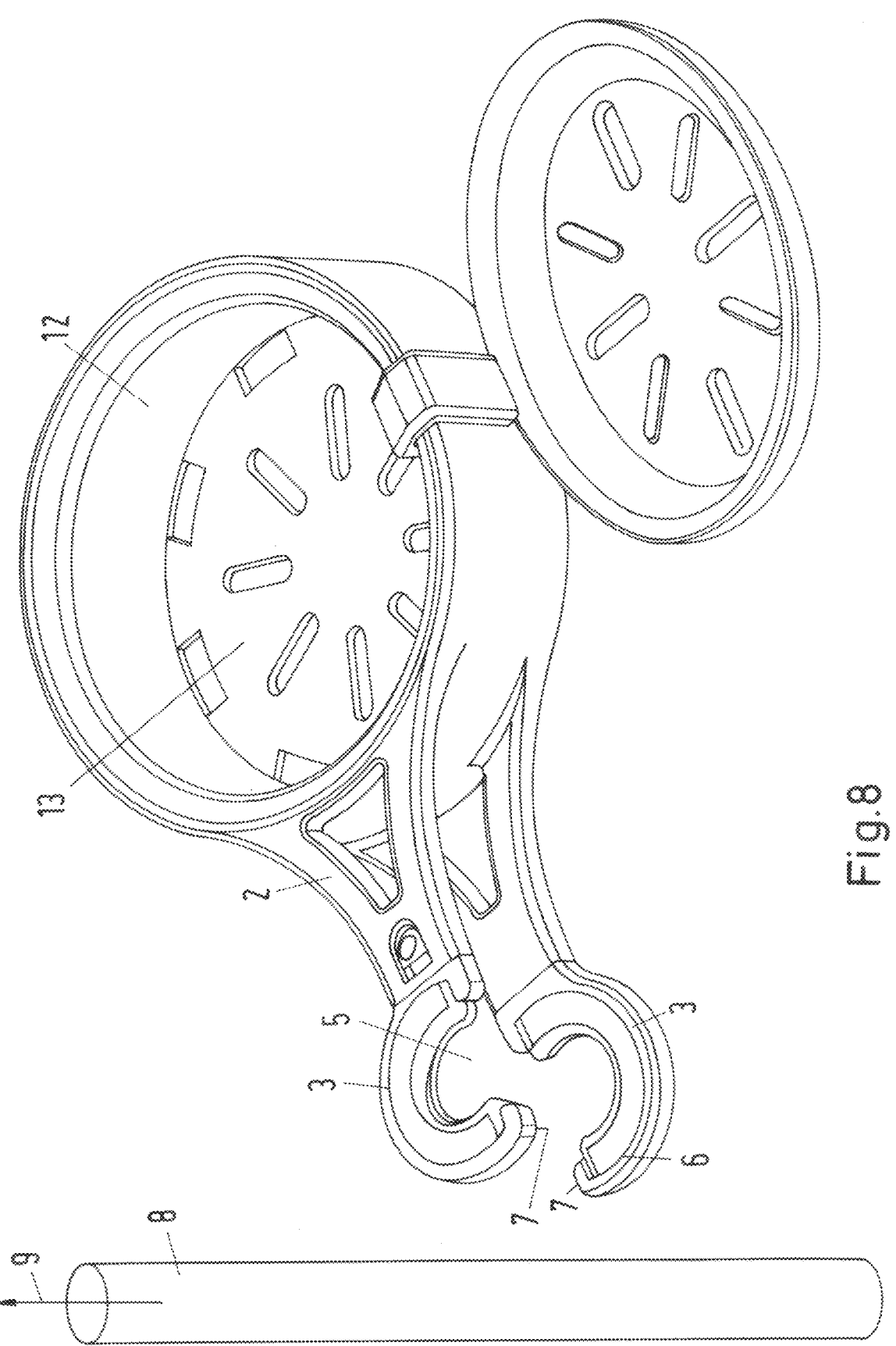

Further advantages, characteristics, and details of the invention are evident from the claims, the following description of preferred embodiments, as well as using the drawing. In this regard, the figures show:

FIG. 1 a perspective representation of a coupling element having two claws that are releasably attached to a coupling body, FIG. 2 a perspective representation of an isolated claw, FIG. 3 a perspective representation of the coupling body with the claw holders, FIG. 4 a side of the coupling body, to illustrate the angle formed between the claws, FIG. 5 a perspective representation of two claws with a clamping spring shown separately, FIG. 6 a representation of an alternative embodiment, corresponding to FIG. 5, FIG. 7 a perspective representation of a coupling element having a bearing parts part formed as a soap dish, and FIG. 8 a representation of an alternative embodiment, corresponding to FIG. 7.

In FIG. 1, a coupling element 1 is shown in the embodiment as a double-claw holder, having two claws 3 arranged on a coupling body 2. The claws 3 are spaced apart from one another in an axial direction 4, and each have two gripping fingers 6 that form a claw opening 5. The free ends 7 of the gripping fingers 6, which delimit the claw opening 5, point in opposite directions and end on opposite sides with reference to the axial direction 4. If the axial direction 4 is concretized, for example, by a rod 8, the claw openings 5 are situated on the right and left or in front of or behind the rod 8, with the axis 9 defined by it.

FIGS. 1 to 3, in particular, make it evident that the claws 3 are releasably connected to the coupling body 2, wherein the connection is implemented by means of a plug-in connection 10 having a snap fit 11 in the exemplary embodiments shown.

A bearing part 12 is assigned to the coupling body 2 or can be connected to it, as is shown in FIGS. 7 and 8, in which the bearing part 12 is formed by a tray 13, if applicable in combination with a pin or a hook, wherein combinations of these are also possible. If the rod 8 is formed by a shower rod, this is generally present in a vertical orientation, so that the base surface of the tray 13 or the plate is oriented perpendicular to the axial direction 4, so as to create a shelf possibility, for example for a soap, a bottle or a brush.

In the case that the rod 8 is structured by a railing rod, a deviating orientation is present, and a corresponding adaptation is required for the bearing part 12. Use of the coupling element 1 can, in particular, also take place in interaction with a rod 8 formed by an infusion stand, so that in hospitals, additional shelf possibilities and holders can be created in the vicinity of the patient. In this regard, the rod 8 can have a round or a polygonal cross-section; a determination in this regard is not necessary in the configuration of the gripping fingers 6.

FIG. 4 shows that in the exemplary embodiment shown, the claws 3 are arranged on the coupling body 2 at an angle to the axial direction 4, and enclose an angle with one another that is between 2° and 45°.

If the gripping fingers 6 enclose a circular surface, the projection of the surfaces of the two claws 3 enclosed by the gripping fingers 6 on the center plane between the two claws 3 corresponds to an ellipse in their basic position. When the two claws 3 are pressed together, their angle changes and therefore the projection also changes, approaching a circle, so that the clamping force of the claws 3 with its gripping fingers 6 can be reduced for a longitudinal displacement of the coupling element 1 in the axial direction 4 on the rod 8.

Use of the coupling element 1 takes place in combination with a rod 8 having a cross-section that is smaller than the distance between the claws 3 in the axial direction 4, so that the rod 8 can be introduced between the claws 3. If the coupling element 1 is then rotated, the rod 8, the cross-section of which is greater than at least one of the claw openings 5, enters between the ends of the gripping fingers

6, through the claw opening 5, into the claws 3, which bring about a clamping effect. To increase the clamping force, the possibilities exist that at least one of the gripping fingers 6 of the claw 3 that has a claw opening 5 that is smaller than the cross-section of the rod 8 has a clamping spring 14 assigned to it and/or that at least one of the gripping fingers 6 of one of the claws 3 has a material 15 having an elevated friction coefficient assigned to it on its inner side.

REFERENCE SYMBOL LIST

1 coupling element
  2 coupling body
  3 claw
  4 axial direction
  5 claw opening
  6 gripping finger
  7 free end
  8 rod
  9 axis
  10 plug-in connection
  11 snap fit
  12 bearing part
  13 tray
  14 clamping spring
  15 material having an increased friction coefficient
  16 hook

The invention claimed is:

1. A coupling element comprising:
   a coupling body; and
   two claws arranged on the coupling body,
   wherein the claws are spaced apart from one another in an axial direction and each claw has two gripping fingers forming a claw opening,
   wherein the free ends of the gripping fingers, which delimit the claw opening, point in opposite directions and end on opposite sides, with reference to the axial direction,
   wherein the claws are arranged on the coupling body inclined relative to the axial direction and enclose an angle with one another, and
   wherein a projection of surfaces of the two claws enclosed by the gripping fingers onto the center plane between the two claws corresponds to an ellipse in a basic position of the two claws.

2. The coupling element according to claim 1, wherein a bearing part is assigned to the coupling body or can be connected to the coupling body.

3. The coupling element according to claim 1, wherein the angle is between 2° and 45°.

4. The coupling element according to claim 1, wherein the claws are releasably connected to the coupling body.

5. The coupling element according to claim 2, wherein the bearing part is formed by a tray or a plate or a pin or a hook.

6. The coupling element according to claim 5, wherein the tray or the plate has a base surface oriented perpendicular to the axial direction.

7. The coupling element according to claim 1, in combination with a rod, wherein the rod has a cross-section smaller than the distance between the claws in the axial direction.

8. The coupling element according to claim 7, wherein the cross-section of the rod is greater than at least one of the claw openings.

9. The coupling element according to claim 8, wherein at least one of the gripping fingers of the claw, the claw opening of which is smaller than the cross-section of the rod, has a clamping spring assigned to the at least one of the gripping fingers.

10. The coupling element according to claim 1, wherein at least one of the gripping fingers of one of the claws has a material having an increased friction coefficient assigned to an inner side of the at least one of the gripping fingers.

11. The coupling element according to claim 6, wherein the rod is formed by a shower rod, by a water fitting, by a railing rod, or by an infusion stand.

12. The coupling element according to claim 7, wherein the rod has a round or a polygonal cross-section.

\* \* \* \* \*